(12) United States Patent
Rosckes

(10) Patent No.: US 8,312,679 B1
(45) Date of Patent: Nov. 20, 2012

(54) SYMBOL FORMS

(76) Inventor: Paul T. Rosckes, Mound, MN (US)

( * ) Notice: Subject to any disclaimer, the term of this patent is extended or adjusted under 35 U.S.C. 154(b) by 229 days.

(21) Appl. No.: 12/459,874

(22) Filed: Jul. 10, 2009

(51) Int. Cl.
*A01G 1/08* (2006.01)
*G09F 21/06* (2006.01)

(52) U.S. Cl. .................. 52/102; 47/33; 40/217

(58) Field of Classification Search .............. 40/217, 40/552; 47/9, 32, 33; 52/102, 103
See application file for complete search history.

(56) References Cited

U.S. PATENT DOCUMENTS

| | | | | |
|---|---|---|---|---|
| 1,434,200 A | * | 10/1922 | Chase | 52/530 |
| 1,933,878 A | * | 11/1933 | Stebbins | 40/217 |
| 1,954,424 A | * | 4/1934 | Otwell | 47/9 |
| 3,287,851 A | * | 11/1966 | Cramer | 47/32 |
| 3,310,910 A | * | 3/1967 | Titus | 47/33 |
| 4,268,992 A | * | 5/1981 | Scharf, Sr. | 47/32.4 |
| 4,392,317 A | | 7/1983 | Boothman | |
| 4,647,491 A | | 3/1987 | Ireland et al. | |
| 4,648,203 A | * | 3/1987 | Worzek | 47/32 |
| 4,858,378 A | * | 8/1989 | Helmy | 47/33 |
| 4,934,093 A | | 6/1990 | Yanna | |
| 4,976,063 A | * | 12/1990 | Young | 47/33 |
| 4,986,025 A | * | 1/1991 | Imperial | 47/2 |
| 4,986,042 A | | 1/1991 | Richardt | |
| 5,117,583 A | * | 6/1992 | Reum | 47/33 |
| 5,323,557 A | * | 6/1994 | Sonntag | 47/32 |
| 5,377,447 A | * | 1/1995 | Fritch | 47/33 |
| D363,801 S | | 10/1995 | Nauseda | |
| 5,528,855 A | * | 6/1996 | Kapphahn | 47/32 |
| 5,711,106 A | * | 1/1998 | Ellis | 47/32 |
| 5,839,222 A | * | 11/1998 | Sittner | 47/32 |
| 5,918,411 A | * | 7/1999 | Hadrava | 47/21.1 |
| 6,247,288 B1 | * | 6/2001 | Harkins | 52/746.11 |
| D472,984 S | * | 4/2003 | Foster | D25/164 |
| 6,625,925 B1 | * | 9/2003 | Foster | 47/33 |
| 6,665,986 B1 | * | 12/2003 | Kaplan | 52/102 |
| 6,811,357 B1 | * | 11/2004 | Haug | 405/285 |
| 7,669,365 B2 | * | 3/2010 | Olink | 47/33 |
| 2002/0121052 A1 | * | 9/2002 | Olink | 52/102 |
| 2003/0009924 A1 | | 1/2003 | Sajadian | |

* cited by examiner

*Primary Examiner* — Darnell Jayne
*Assistant Examiner* — Joshua Rodden
(74) *Attorney, Agent, or Firm* — Richard John Bartz

(57) ABSTRACT

A form or mold for letters and numbers is filled with different color stucco and mounted to the side of a building or used in landscaping and filled with different color mulch or rocks to display names and addresses. The letters and numbers can have an illuminating feature.

8 Claims, 4 Drawing Sheets

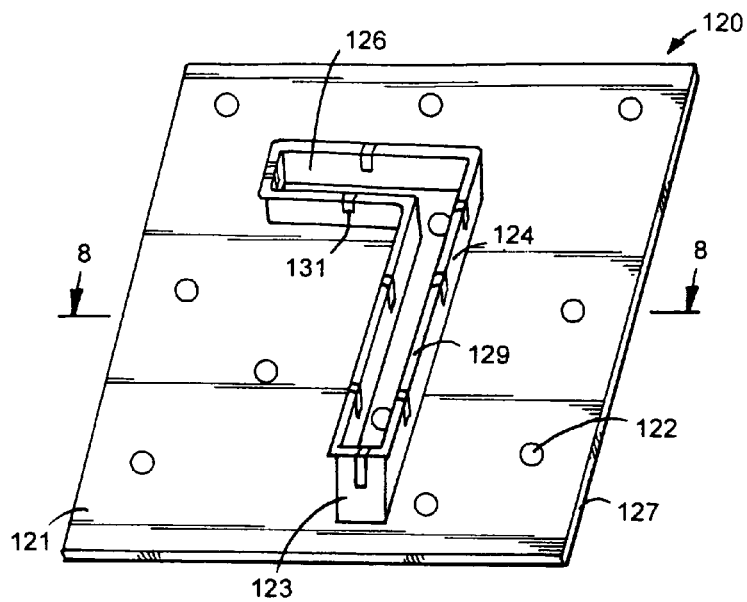
FIG.6
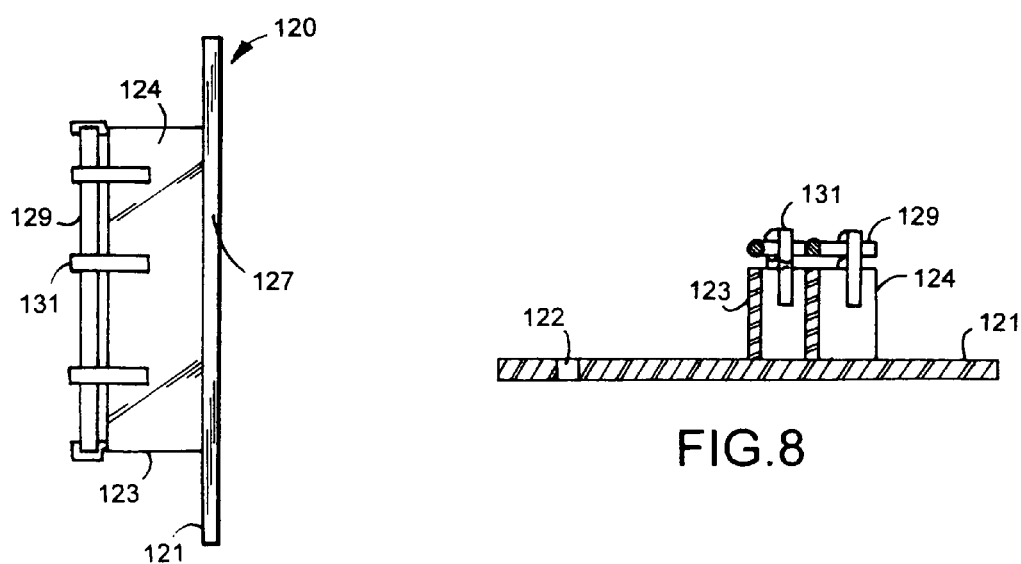
FIG.7
FIG.8

SYMBOL FORMS

FIELD OF THE INVENTION

The invention relates to the field of forms for making symbols. The symbols are used to display business and family names and addresses.

BACKGROUND OF THE INVENTION

Homeowners spend a great deal of time decorating the interior and exterior of their homes. They often find ways to enliven bare and boring areas of the home to create eye-catching displays. There is a need for a lettering and numbering apparatus and method that enables property owners to display family names, business names, logos and addresses on a ground surface or an exterior surface of a building.

E. F. Boothman in U.S. Pat. No. 4,392,317 discloses a method of constructing plastic letters for signs.

D. T. Ireland et al in U.S. Pat. No. 4,647,491 disclose a landscaping edging that can be formed into any shape.

H. E. Yanna in U.S. Pat. No. 4,934,093 discloses a landscape edging system for defining a border to hold mulch.

A. Richardt in U.S. Pat. No. 4,986,042 discloses a landscape border brick system that includes a plurality of bricks and a plurality of connectors for interconnecting bricks to form specific shapes.

L. Nauseda in U.S. Pat. No. Des. 363,802 discloses the design of a landscape border.

Z. N. Sajadian in U.S. Patent Application Publication No. 2003/0009924 discloses outdoor illuminated numbers and letters that can be used to display street address numbers.

SUMMARY OF THE INVENTION

The invention is a series of molds or forms replicating letters and numbers that is used to display family names, business names and addresses in landscaping and is filled with different color mulch or rocks. The forms can also be mounted to the side of a building to display names and addresses and filled with different color stucco. The form has a base adapted to be placed on a ground surface. An upright wall joined to the base defines an interior space. The wall has a top edge having a shape generally outlining the shape of a symbol. A first filler material is located on the base adjacent an outer surface of the wall and surrounds the interior space. A second filler material contrasting from the first filler material is located in the interior space adjacent an inner surface of the wall and substantially filling the interior space whereby the symbol is displayed on the ground surface.

DESCRIPTION OF THE DRAWING

FIG. 6 is a perspective view of a first modification of the form of FIG. 1;

FIG. 7 is a side elevational view of the form of FIG. 6;

FIG. 8 is a sectional view taken along line 8-8 of FIG. 6;

DESCRIPTION OF PREFERRED EMBODIMENT

Figure 1:
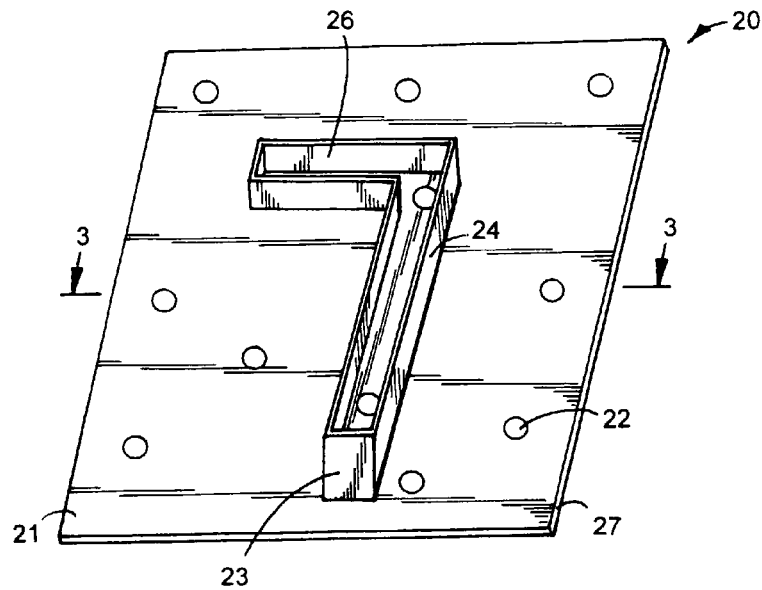
FIG. 1 is a perspective view of a symbol form of the invention.
Figure 2:
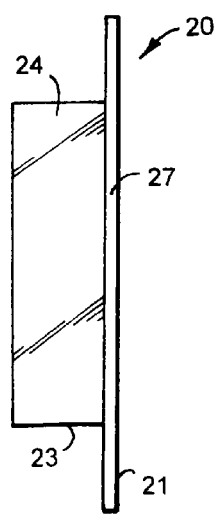
FIG. 2 is a side elevational view of the form of FIG. 1.
Figure 3:
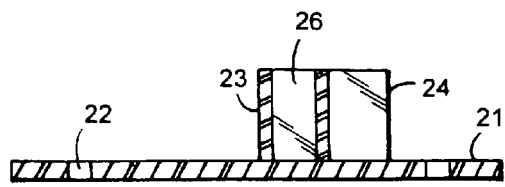
FIG. 3 is a sectional view taken along line 3-3 of FIG. 1.

Referring to FIGS. 1 to 3, there is shown a symbol form 20 of the invention adapted to be staked to the ground in a landscaped area. Form 20 is preferably a plastic molded member having a number or letter used in ornamental landscapes to display names and addresses at residential homes and/or commercial business locations. Form 20 may be formed from suitable material such as nylon or other readily deformable plastic materials. Form 20 has a generally flat base 21 joined a raised wall 24 that defines a symbol 23, shown as the number "7". Wall 24 is a continuous relatively thin strip of plastic material preferably having a uniform width of approximately 3 inches and a thickness of approximately ⅛ inch. Wall 24 can be made of different materials and can have different widths, such as 2 inches or 1 inch, and different thicknesses. Also, the width of wall 24 may be varied throughout its length if desired. Wall 24 can be formed to make any desired symbol, letter, number, character, or logo in any particular font style, or size.

In landscaped areas such as flower gardens, rock gardens, front entry ways and the like, form 20 is adapted to be positioned on the ground and be filled with different color or contrasting fill, such as mulch, wood chips or rock, to highlight symbol 23. Form 20 has a generally flat rectangular shaped base 21. Wall 24 is attached to a central portion of base 21 and extends upwardly from the top surface of base 21 to form an open top interior space 26. Base 21 has a plurality of holes 22 that extend through base 21 to allow base 21 to be staked to the ground. Holes 22 also function to allow for drainage of water and moisture through form 20. Holes 22 located in the center area of base 21 are in communication with space 26 to allow drainage from space 26. Base 21 has a generally linear side edge 27 that is adapted to be aligned with the edge of an adjacent form to facilitate proper spacing between successive symbols when used in landscaping. Preferably base 21 is a 3 foot by 3 foot square member with symbol 23 located in a 2 foot by 2 foot centered portion of base 21. Centering symbol 23 on base 21 allows a first fill to be placed on base 21 and surround the outer surfaces of symbol 23. A second fill contrasting with the first fill can be placed on base 21 within the interior of symbol 23 whereby wall 24 separates the first and second fills. Base 21 and symbol 23 can have other sizes and shapes depending upon the desired landscape application.

Figure 4:
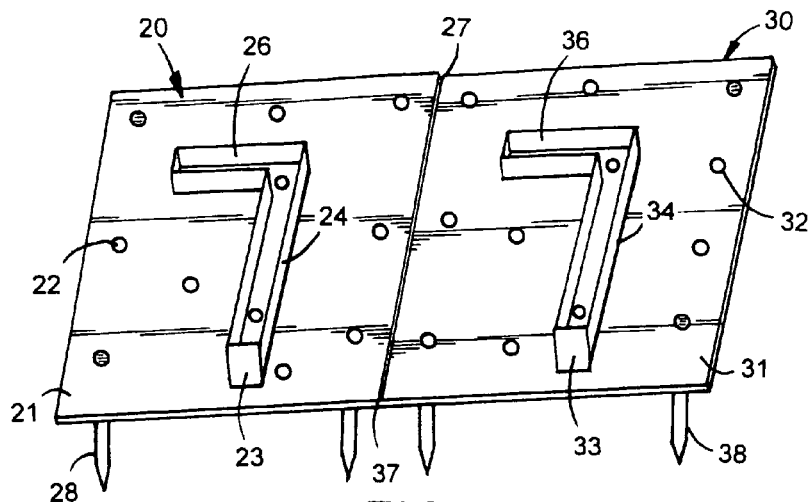
FIG. 4 is a perspective view of the symbol form of FIG. 1 located adjacent a second symbol form adapted to be staked to the ground for landscaping.
Figure 5:
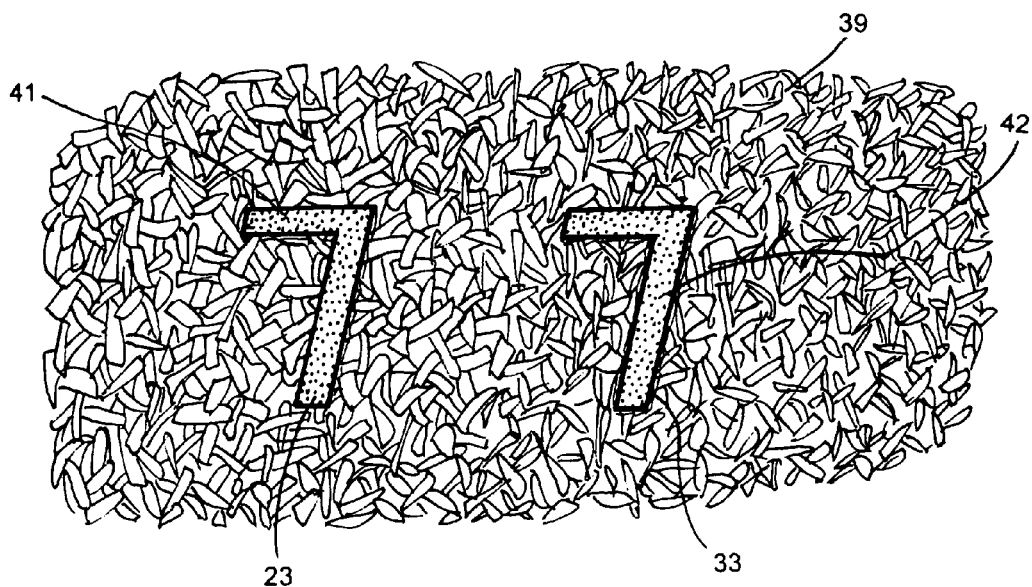
FIG. 5 is a perspective view of the forms of FIG. 5 filled with mulch.

A series of moldings or forms 20 and 30 that replicate a residential or commercial address numbers, such as the address number "77", as seen in FIGS. 4 and 5, is adapted to display the address on the surface of the ground. Varying colors of mulch or different types of ground cover can be poured into open top interior spaces 26 and 36 of symbols 23 and 33 and onto bases 21 and 31 of forms 20 and 30, creating distinctive and an easily recognizable decorative address number. Vegetation could also be planted within the borders of symbols 23 and 33 to allow numbers or names to be formed in this manner.

Preferably produced from plastic, separate forms 20 and 30 have raised walls 24 and 34 that extend upwardly from bases 21 and 31 about 3 inches high to define symbols 23 and 33. Forms 20 and 30 can feature varying widths dependent upon the address or name that is being replicated. Before groundcover is poured into forms 20 and 30, side edges 27 and 37 of bases 21 and 31 are aligned. Stakes or spikes 28 and 38 are driven through holes 22 and 32 in base 21 and 31 and into the ground to securely hold forms 20 and 30 in place. Holes 22 and 32 also function to allow drainage through bases 21 and 31. A first filler material 39, such as wood chip, shredded tree bark, sawdust, pine needle, compost, buckwheat hull, peanut shells and shredded yard waste mulch or decorative stone is placed on bases 21 and 31 surrounding the outer surfaces of symbols 23 and 33, as shown in FIG. 5. A second filler material 42 contrasting with first filler material 39, such as mulch or decorative stone, is placed in interior spaces 26 and 36 of symbol 23 and 33. Walls 24 and 34 function to separate first and second filler materials 39 and 42 whereby address 41 is distinctly displayed.

A modification of the symbol form, indicated at 120, shown in FIGS. 6 to 8, is adapted to be staked to the ground in a landscape to illuminate displayed names and addresses at residential and commercial properties. The parts of form 120 that correspond to form 20 shown in FIGS. 1 to 3 have the same reference number with a prefix 1. Form 120 is a generally rectangular shaped having a flat base 121 with a linear side edge 127. A plurality of holes 122 extend through base to allow for drainage. Stakes can be inserted through holes 122 to secure form 120 to the ground. Spaced inwardly from the outer edges of base 121 is a symbol 123, shown as the number "7" in FIG. 6. Symbol 123 has an upright continuous wall 124 attached to base 121 to define an upright interior area 126 adapted to accommodate filler material, such as mulch, rock and the like. Symbol 123 has an open top to allow the filler material to be placed into area 126. Wall 124 contains the filler material in area 126 and separates contrasting filler material placed adjacent the outer surface of wall 124 from the first filler material. Form 120 has an illuminating member 129, such as solar powered rope lighting, extended along the top of wall 124 and attached to wall 124 with clips 131. Illuminating member 129 functions to illuminate symbol 123 and make symbol 123 readily visible in low visibility conditions.

Figure 9:
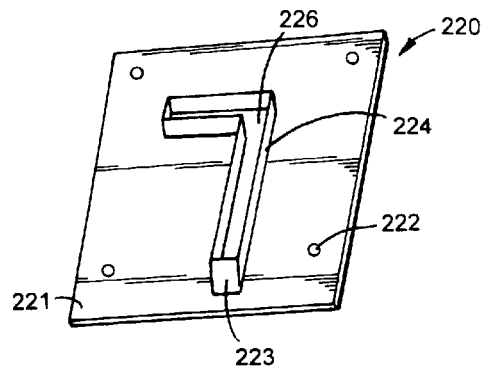
FIG. 9 is a perspective view of a second modification of the symbol form of FIG. 1.
Figure 10:
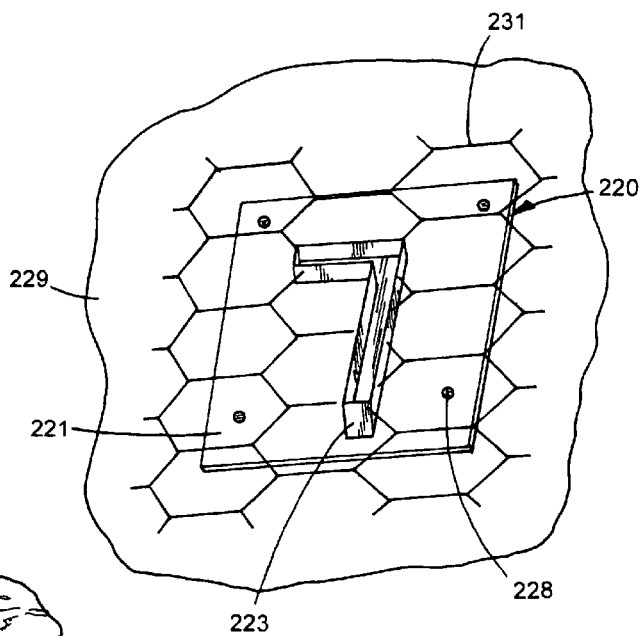
FIG. 10 is a perspective view of the form of FIG. 9 secured to the side of a building having wire mesh for stucco.
Figure 11:
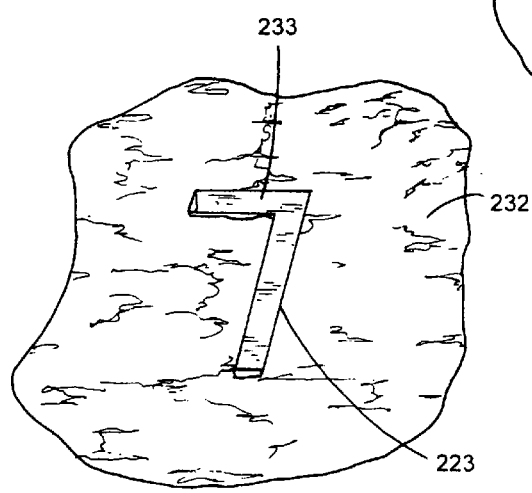
FIG. 11 is a perspective view of the form of FIG. 9 filled with stucco.

A second modification of the form, indicated at 220, shown in FIGS. 9 to 11, is adapted to be permanently affixed to an upright wall of a building to display names and addresses at residential properties and/or commercial business locations. The parts of form 220 that correspond to form 20 shown in FIGS. 1 to 3 have the same reference number with a prefix 2. Form 220 has a generally flat rectangular base 221 with holes 222 located in each corner of base 221 adapted to accommodate fasteners 228 to permanently affix form 220 to wall 229 of a building. A symbol 223 having a raised wall 224 attached to base 221 has an interior space 226. Form 220 is embedded in metal wire mesh lath 231 used as a base for stucco or other building siding materials. Lath 231 is filled with a first siding material 232. A second siding material 233 that contrasts with first siding material 232 is placed in space 226 of symbol 223. First and second siding materials 232 and 233 are preferably stucco that have contrasting appearance such as a different color and/or surface texture whereby symbol 233 is highlighted on wall 229.

There has been shown and described embodiments of the symbol forms of the invention. Changes in the materials, structures, and arrangement of structures may be made by persons skilled in the art without departing from the invention.

The invention claimed is:

1. A form for a symbol useable in a landscaping environment comprising: a plastic molded member having a flat water pervious base adapted to be placed on a ground surface, the base having a plurality of holes extending through the base to allow for drainage of water through the base, at least one stake member located in one of the holes to attach the plastic molded member to the ground surface, the base having a generally linear side edge adapted to align with a side edge of an adjacent symbol form, the base having a center portion spaced inwardly from a periphery of the base, an upright wall extending upwardly from the center portion of the base to define an interior space, the upright wall having a top edge, the top edge having a shape generally outlining the shape of a symbol, the symbol comprising a letter A to Z or a whole number 0 to 9, a first wood chip material located on the base adjacent an outer surface of the upright wall and surrounding the interior space, a second wood chip material contrasting from the first wood chip material, the second wood chip material located in the interior space adjacent an inner surface of the wall and substantially filling the interior space whereby the symbol is displayed on the ground surface.

2. The form of claim 1 wherein: the first wood chip material has a first color, the second wood chip material has a second color different from the first color.

3. The form of claim 1 wherein: the base is a generally rectangular shaped member.

4. A form for a name or an address number used in a landscaping environment comprising: a first member having a first generally flat rectangular water pervious base adapted to be placed on a ground surface, a second member having a second generally flat rectangular water pervious base adapted to be placed on the ground surface adjacent the first member, the first base having a generally linear side edge located in alignment with a generally linear side edge of the second base when the second member is placed on the ground surface adjacent the first member, a plurality of holes extending through the first and second bases to allow for drainage of water through the first and second bases, at least one stake member located in one of the holes in each base to attach the respective first and second bases to the ground surface, each base having a center portion, an upright wall joined to the center portion of each base and spaced inwardly from a periphery of the respective first or second base, each upright wall defining an interior space, each upright wall having a top edge, each top edge having a shape generally outlining the shape of a symbol, each symbol comprising a letter A to Z or a whole number 0 to 9 used to form a name or an address number, a first filler material located on top surfaces of the first and second bases adjacent the upright walls and surrounding the interior spaces, a second filler material contrasting from the first filler material, the second filler material located in the interior spaces of the first and second members and substantially filling the interior spaces whereby the name or address number is displayed on the ground surface.

5. The form of claim 4 wherein: the first filler material is a wood chip material having a first color, the second filler material is a wood chip material having a second color contrasting with the first color.

6. A form for a symbol used in a landscape environment comprising:
 a generally flat rectangular water pervious base;
 a plurality of holes extending through the base to allow for drainage of water through the base;
 at least one stake member located in one of the holes to attach the base to a ground surface in a landscape environment;
 the base having a top surface and a flat bottom surface;

a continuous upright wall having an outside surface extending upwardly from the top surface of the base, the upright wall spaced inwardly from a periphery of the base;

the upright wall defining an enclosed interior space;

the upright wall having a top edge, the top edge having a shape generally outlining the shape of a letter A to Z or a whole number 0 to 9, a first filler material covering the top surface of the base and located adjacent an outside surface of the upright wall; and a second filler material contrasting from the first filler material, the second filler material located in and substantially filling the enclosed interior space whereby the letter A to Z or whole number 0 to 9 is displayed on the ground surface.

7. The form of claim 6 wherein:

the periphery of the base is capable of aligning with the periphery of one or more symbol forms to form a word or address number.

8. The form of claim 6 wherein:

the first filler material is a water pervious wood chip material having a first color;

the second filler material being a second water pervious wood chip material having a second color contrasting from the first color.

* * * * *